United States Patent Office 3,194,773
Patented July 13, 1965

3,194,773
PROCESS OF MAKING POLYURETHANE FOAMS
Fritz Hostettler, Charleston, W. Va., assignor to Union Carbide Corporation, a corporation of New York
No Drawing. Filed June 14, 1961, Ser. No. 116,977
15 Claims. (Cl. 260—2.5)

This application is a continuation-in-part of application Serial No. 776,200, filed November 25, 1958, now abandoned, which was a continuation-in-part of application Serial No. 686,009, filed September 25, 1957, now abandoned.

The present invention relates generally to the art of polyurethane resins which are, generally speaking, the products of a reaction of a polyisocyanate and a compound having an active hydrogen atom. More particularly, this invention is directed to polyether-polyurethane foamable compositions; to stable polyurethane foamed resins comprising tin-catalyzed reaction products of polyethers and polyisocyanates and to the novel process for their preparation.

In recent years, foamed resins, and particularly polyurethane foams of the polyester type, have dominated the field and have become increasingly useful for structural applications, crash pads for automobiles, bed pillows, milady's dainty unmentionables, upholstery, mattresses, cushions, vibration dampening devices, rub backing materials and the like. However, with the advent of foamed resins and their continued wide acceptance, the emphasis naturally shifted to searching for the most inexpensive raw materials which would still provide foamed resins embodying the necessary physical characteristics to be suitable for any of the above-mentioned applications. One of the cheapest sources of raw materials for foamed resins are those based on the polyols of the polyether type, hereinafter referred to as polyethers. However, certain physical properties of the polyols based on polyethers (i.e., inherently low viscosities and frequently undesirably low reactivity) are largely responsible for the lack of foam stability. In order to overcome the low viscosity characteristic of the polyether and impart foam stability, it became necessary to pre-react the polyether with an organic polyisocyanate in the absence of water to form a so-called "prepolymer" or a linear polyether-polyurethane polymer prior to further reaction with additional polyisocyanate, and water in the presence of a catalyst and an emulsifier. This procedure has become popularly known as the "prepolymer foaming technique" and is basically a two-step process. The first step comprises heating the polyether together with a substantially equimolar quantity of an organic diisocyanate in the absence of water at a temperature in the range of from 100° C. to 120° C. for several hours to form a linear polymer containing a plurality of urethane linkages. Subsequently, the "prepolymer" is mixed with from two to three additional mols of diisocyanate at a temperature of from 100° C. to 120° C. Water, a tertiary amine catalyst and a surfactant are then added to produce a foam.

After the mixture has foamed, it is necessary to postcure the same by heating for several hours at temperatures in the range of 200° F. to 250° F. in order to provide a foam of optimum physical properties.

As may be readily observed, one of the most serious disadvantages of the "prepolymer technique" is the excessive cost factor which is added as a result of the step of prepolymer formation. It has been observed that the processing charge per pound of prepolymer formulation is approximately seven cents which amounts to about 17.5 cents per cubic foot of polyurethane foam having a density of 2.5 pounds per cubic foot.

The process of this invention is based on the discovery that stable polyurethane foams can be produced directly when a polyether and organic polyisocyanate are reacted in the presence of a foaming or blowing agent such as water, a particular tin catalyst, hereinafter described, and a surfactant system comprising a polysiloxane-polyoxyalkylene oxide copolymer. The novel process of this invention obviates the "prepolymer" formation step as well as the required high temperature heat curing step of previously known processes and, in addition, provides novel stable foamed resins possessing somewhat higher compressive strength of "prepolymer" foams of comparable composition.

It is an object of this invention to provide a novel series of stable polyether-polyurethane foams which possess superior desirable physical properties. It is a further object of this invention to provide a novel process for the production of the above-mentioned foams. A still further object of this invention is to provide a novel process for the production of stable foams which does not require the employment of the step of "prepolymer" formation.

The process of this invention comprises reacting a polyether, an organic polyisocyanate and a foaming or blowing agent such as water in the presence of an organic tin compound characterized by the presence therein of at least one direct carbon to tin valence bond and a surfactant comprising a polysiloxane-oxyalkylene copolymer.

As used herein, the term "polyether" is intended to include linear and branched polyethers having at least one and preferably a plurality of ether linkages and containing at least two hydroxyl groups and being substantially free from functional groups other than hydroxyl. Preferred polyethers are the polyoxyalkylene polyols. Among the polyoxyalkylene polyols which are useful in the practice of this invention are the polyethylene glycols having average molecular weights of 200, 400 and 600 and the polypropylene glycols having average molecular weights of 400, 750, 1200 and 2000. Polymers and copolymers of polyoxyalkylene polyols are also adaptable in the process of this invention as well as the block copolymers of ethylene and propylene oxide. Among the copolymers of polyoxyalkylene polyols, and particularly propylene oxide, that deserve some special mention are the propylene oxide adducts of ethylene glycol, glycerol, 1,2,6-hexanetriol, trimethylolpropane, trimethylolethane, pentaerythritol, sorbitol, triethanolamine, triisopropanolamine, ethylene diamine, diethylenetriamine and ethanolamine, more fully described hereinafter. Linear and branched copolyethers of ethylene oxide and propylene oxide have also been found to be useful in making the foamed products of this invention. Preferred copolymers of propylene oxide and ethylene oxide are those containing 10 percent ethylene oxide in molecular weights of 500, 2000, 3000 and 4000.

It is to be understood that the term "substantially free of functional groups other than hydroxyl" does not exclude the presence of other functional groups such as amino or carboxyl except when the essential character of the starting material as a polyether is destroyed. As hereinafter disclosed, it is sometimes desirable to employ branched chain polyethers as starting materials in the process of the invention and, as disclosed, polyfunctional initiators containing functional groups of the type aforesaid are useful for such purposes. To this extent then, the polyether starting materials are substantially free from functional groups other than hydroxyl.

Further useful types of polyethers in the process of this invention are block copolymers prepared from propylene oxide and ethylene oxide. These polyethers can be characterized by reference to the following general formula:

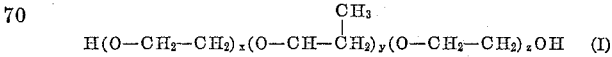

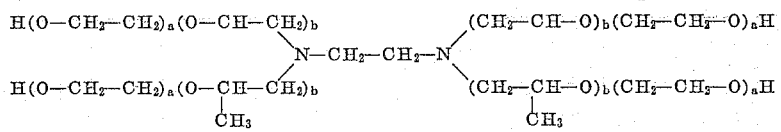

wherein Formula I subscripts $x$, $y$ and $z$, represent positive integers in the range of from 2 to 100 and the subscripts $a$ and $b$ of Formula II represent positive integers in the range of from 1 to 200.

Polyethers having a highly branched chain network are also useful in the process of this invention. Such highly branched chain polyethers are readily prepared from alkylene oxides of the type above described and initiators having a functionality greater than two. Highly branched polyethers have the advantage of making possible cross linking without the interaction of urea or urethane groups with the isocyanate groups. This has the advantage of making a larger proportion of the isocyanate used available for the evolution of carbon dioxide and the reducing of the overall amount of isocyanate that is required in the preparation of the foamed polymer.

The higher functional initiators that are useful with the alkylene oxides, described above, include polyols, polyamines and amino alcohols having a total of three or more reactive hydrogen atoms on hydroxyl and primary or secondary amino groups. Suitable polyols include triols, such as glycerol, trimethylolpropane, butanetriols, hexanetriols, trimethylolphenol, novolaks, trialkanolamines, various tetrols, such as erythritol and pentaerythritol; pentols; hexols, such as dipentaerythritol and sorbitol, as well as carbohydrates, polyhydroxy fatty acid esters, such as castor oil and polyoxyalkylated derivatives of polyfunctional compounds having three or more reactive hydrogen atoms, such as, for example, the reaction product of trimethylolpropane, glycerol and other polyols with ethylene oxide, propylene oxide or other epoxides or copolymers thereof, e.g., copolymers of ethylene and propylene oxides. Higher functional amino alcohols and polyamines include, by way of example, ethanolamine, diethanolamine, triethanolamine, isopropanolamine, diisopropanolamine, tri-isopropanolamine, 2-(2-aminoethylamino)ethanol, 2-amine-2-(hydroxymethyl)-1,3-propanediol, diethylenetriamine, triethylenetetraamine, urea and urea-formaldehyde polymers, as well as various aryl polyamines, such as 4,4',4''-methylidynetrianiline.

Preferred polyethers of the branched type are those prepared by adding propylene oxide to various diols, triols, tetrols and polyols as starters to produce adducts of various molecular weights. Polyethers which deserve special mention are the 1,2,6-hexanetriol and glycerol aducts of propylene oxide having molecular weights of 250, 500, 700, 1500, 2500, 3000 and 4000.

Further useful types of polyethers in the process of this invention are block copolymers prepared from propylene and ethylene oxide with the above described higher functional initiators. Block copolymers containing no more than about 35 weight percent of ethylene oxide are preferred.

Another means of increasing the degree of branching, if desired, when employing linear polyethers in the process of this invention is to include a highly functional initiator, as described above, in the mixture charged to the reaction.

The amount of highly functional initiator normally employed with the linear type polyethers described above is an amount in the range of from 0.5 to 6.0 percent by weight of said initiator based on the weight of polyether charged to the reaction.

The polyethers suitable for employment in the process of this invention can be conveniently characterized as normally liquid, pourable polyethers having viscosities in the range of from 50 centipoises to about 500,000 centipoises at room temperature (i.e., 25° C.) and having preferably molecular weights in the range of from 200 to about 10,000. When employing polyethers having molecular weights in the range above described, it is readily apparent that foams can be prepared which are tailor-made to the requirements of specific applications. For example, where maximum flexibility of the foamed polymer is a primary requirement, the polyether should, for optimum results, have a molecular weight of approximately 1,500–7,000 if it is a branched type polyether and somewhat less, about 1,000–2,000 if it is a substantially linear type polyether. While it has not been definitely established for semi-rigid foams, the molecular weight of branched polyethers should be in the range of from 700 to about 1,500 and of linear polyethers in the range of from 250–1,000. When it is desired to produce a rigid foam, the molecular weight of the starting polyether should be in the range of from 250–1,000 if the polyether is branched; if linear, the molecular weight of the polyether should be somewhat less, that is, about 200–500.

The average molecular weight and reactivity of the polyether can be readily determined by analysis for hydroxyl and carboxyl content. The acid or carboxyl number (mg. of KOH per gram of polyether using phenolphthalein as an indicator) is a measure of the number of terminal carboxyl groups. The hydroxyl number, which is a measure of the number of terminal hydroxyl groups, is defined in terms of mg. of KOH per gram of polyether and is determined by adding pyridine and acetic anhydride to the polyether and titrating the acetic acid formed with KOH. The sum of acid or carboxyl number and the hydroxyl number, referred to as the reactive number, is an indication of the average number of terminal groups present in the polyether and, therefore, is, in turn, an indication of the degree of polymerization. Molecular weight can readily be calculated from the hydroxyl and carboxyl numbers by reference to the formula:

$$MW = \frac{\text{Functionality} \times 1000 \times 56.1}{\text{OH No.} + \text{COOH No.}}$$

The polyisocyanates and polyisothiocyanates which find utility in the process of this invention are those corresponding to the general formula:

$$R(NCY)_x$$

wherein $x$ is two or more, R is a divalent organic radical free of functional groups other than —(NCY) and Y is an oxygen or sulfur atom. More particularly, R can be alkylene, substituted alkylene, arylene, substituted arylene, a hydrocarbon or substituted hydrocarbon containing one or more aryl-NCY bonds and one or more alkyl-NCY bonds, a hydrocarbon or substituted hydrocarbon containing a plurality of either aryl-NCY or alkyl-NCY bonds. R can also include radicals, such as —R—Z—R— where Z may be any divalent moiety such as —O—,

—O—R—O—, —CO—, —CO$_2$—, —S—, —S—R—S—, —SO$_2$—

Examples of such compounds include hexamethylene diisocyanate, xylylene diisocyanates, (OCHNCH$_2$CH$_2$CH$_2$OCH$_2$)$_2$ 1-methyl-2,4 - diisocyanatocyclohexane, phenylene diisocyanates, tolylene diisocyanates, chlorophenylene diisocyanates, diphenylmethane-4,4' - diisocyanate, naphthalene-1,5-diisocyanate, triphenylmethane-4,4',4''-triisocyanate, xylylene-α,α'-diisothiocyanate, and isopropylbenzene-α,4-diisocyanate.

The organic isocyanates are preferred for the reason that, while the organic isothiocyanates are adaptable in the process of the invention, they will decompose during foaming generating poisonous carbon oxysulfide.

The organic tin compounds which have been found to be particularly adapted for use in the process of this invention are characterized by the presence in the catalyst molecules of at least one direct carbon to tin valence bond.

Extensive testing of a large variety of organic tin compounds has indicated that while they vary somewhat in their activity, all tin compounds having a direct carbon to tin valence bond and at least one catalytically intensifying bond from said tin to halogen, oxygen, sulfur, nitrogen or phosphorus possess outstanding catalytic activity in the process of this invention. The tin compounds of most intense, yet controllable, and, therefore, optimum catalytic activity, are those having from one to three carbon bonds directly bonded to a given tin atom and one or more catalytically intensifying bonds from said given tin atom to a halogen, oxygen, sulfur, nitrogen or phosphorus atom. Among the many types of tin compounds having carbon to tin bonds, of which specific representative compounds have been tested and shown to be active, are tin compounds having the general formulae set forth below:

(a) $R_3SnX$
(b) $R_2SnX_2$
(c) $RSnX_3$
(d) $R_2SnY$
(e) $RSnOOR'$
(f) $R(SnOOR')_2$
(g) 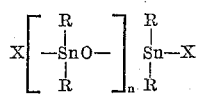
(h) $R_2Sn(YRX)_2$ in which the R's represent hydrocarbon or substituted hydrocarbon radicals, such as alkyl, aralkyl, aryl, alkaryl, alkoxy, cycloalkyl, alkenyl, cycloalkenyl and analogous substituted hydrocarbon radicals, the R's represent hydrocarbn or substituted hydrocarbon radicals, such as those designated by the R's or hydrogen or metal ions, the X's represent hydrogen, halogen, hydroxyl, amino, alkoxy, substituted alkoxy, acyloxy, substituted acyloxy, acyl radicals or organic residues connected to tin through a sulfide link, and the Y's represent chalcogens including oxygen and sulfur.

Among the compounds of group (a) that deserve special mention are trimethyltin hydroxide, tributyltin hydroxide, trimethyltin chloride, trimethyltin bromide, tributyltin chloride, trioctyltin chloride, triphenyltin chloride, tributyltin hydride, triphenyltin hydride, triallyltin chloride, and tributyltin fluoride.

The compounds of group (b) that deserve particular mention and are representative of the group include dimethyltin diacetate, diethyltin diacetate, dibutyltin diacetate, dioctyltin diacetate, dilauryltin diacetate, dibutyltin dilaurate, dibutyltin maleate, dimethyltin dichloride, dibutyltin, dichloride, dioctyltin dichloride, diphenyltin dichloride, diallyltin dibromide, diallyltin diiodide, bis(carboethoxymethyl)-tin diiodide, dibutyltin dimethoxide, dibutyltin dibutoxide, $(C_4H_9)_2Sn[OCH_2(CH_2OCH_2)_{x-1}CH_2OCH_3]_2$ (in which $x$ is a positive integer), dibutyl-bis[O-acetylacetonyl]-tin, dibutyltin-bis(thiododecoxide), and $(C_4H_9)_2Sn(SCH_2CONO)_2$ all readily prepared by hydrolysis of the corresponding dihalides. Many commercially available compounds used as stabilizers for vinyl resins are also included in this group.

Among the compounds that are representative of group (c) are butyltin trichloride, octyltin trichloride, butyltin triacetate and octyltin tris(thiobutoxide).

Typical among the compounds of group (d) are dimethyltin oxide, diethyltin oxide, dibutyltin oxide, dioctyltin oxide, dilauryltin oxide, diallytin oxide, diphenyltin oxide, dibutyltin sulfide, $[HOOC(CH_2)_5]_2SnO$, $[CH_3OCH_2(CH_2OCH_2)_{x-1}CH_2]_2SnO$ and $[CH_3OCH_2(CH_2OCH_2)_{x-1}CH_2O(CH_2)_5]_2SnO$ (in which the $x$'s are positive integers).

Methylstannonic acid, ethylstannonic acid, butylstannonic acid, octylstannonic acid, $HOOC(CH_2)_5-SnOOH$,

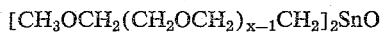

$CH_3OCH_2(CH_2OCH_2)_{x-1}CH_2SnOOH$ and $CH_3OCH_2(CH_2OCH_2)_{x-1}CH_2O(CH_2)_5SnOOH$ are examples of group (e) catalysts and group (f) catalysts are represented by $HOOSn(CH_2)_xSnOOH$ and $HOOSnCH_2(CH_2OCH_2)_xCH_2SnOOH$, the $x$'s being positive integers.

Typical compounds in group (g) include compounds as poly(dialkyltin oxides) such as dibutyltin basic laurate and dibutyltin basic hexoxide.

Other compounds that are efficient catalysts are those of group (h), of which the organo-tin compounds used as heat and light stabilizers for chlorinated polymers and available under the trade names Advastab 17 M (a dibutyltin compound found, upon analysis, to contain two sulfur-containing ester groups), Advastab T–50–LT (a dibutyltin compound found, upon analysis, to contain two ester groups) are typical, as well as many other organo-tin compounds available commercially.

The surfactant systems that have met with considerable success when employed in the process of the invention are those containing siloxane-oxyalkylene copolymers. The siloxane-oxyalkylene copolymers which show considerable promise are the linear (block) copolymers of polymeric alkylene oxides and polymeric dialkylsiloxanes; branched (graft) copolymers of polymeric alkylene oxides and polymeric dialkylsiloxanes and copolymers of a dialkylsiloxane and an alkylene oxide.

The siloxane-oxyalkylene copolymer surfactant systems which have been found to be adaptable for use in the process of this invention are those copolymers which contain from about 10 to about 80 percent by weight of siloxane polymer and from 90 to 20 percent by weight of alkylene oxide polymer.

For the most part, the surfactant systems comprise predominantly dihydrocarbyl polysiloxane units and oxyalkylene units and may contain one or more, and preferably not more than two or three mono-hydrocarbyl siloxane units (i.e., not more than two or three bifunctional silicon atoms). Normally, the siloxane units are present in combinations of one or more units forming a chain which comprises the polysiloxane block or blocks of the copolymer.

Thus, one type of block copolymer adapted for use in the surfactant systems in the process of this invention can be represented by the following general formula:

$(R')(SiO_3)_x(R_2SiO)_y[(C_nH_{2n}O)_zR'']_a[R''']_{3x-a}$ (I)

where $x$ is an integer and represents the number of trifunctional silicon atoms bonded to a single monovalent or multivalent hydrocarbyl radical, R'; $a$ is an integer and represents the number of polyoxyalkylene chains in the block copolymer; $y$ is an integer having a value of at least 3 and denotes the number of difunctional siloxane units, $n$ is an integer from 2 to 4 denoting the number of carbon atoms in the oxyalkylene group; and $z$ is an integer having a value of at least 5 and denotes the length of the oxyalkylene chain. It will be understood further that the surfactant compositions are mixtures of such block copolymers wherein $y$ and $z$ are of different values and that methods of determining the chain length of the polysiloxane chains and the polyoxyalkylene chains give values which represent average chain lengths. In the above formula, R and R″ represent monovalent hydrocarbyl radicals, such as alkyl, aryl or aralkyl radicals, and R″ terminates a polyoxyalkylene chain with a monoether group, R‴ is an alkyl radical or a trihydrocarbylsilyl radical and may terminate a siloxane chain, and R′ represents a monovalent or polyvalent hydrocarbyl radical, being monovalent when $x$ is 1, divalent when $x$ is 2, trivalent when $x$ is 3, tetravalent when $x$ is 4.

With reference to Formula I above, there is at least one oxyalkylene chain joined to a siloxane chain through a Si—O—C bond, and when $a=1$ and $x=1$, there are two alkyl or trihydrocarbylsilyl groups R‴ terminating siloxane chains. However, when $a=3$ and $x=1$, there are no such groups present.

One type of block copolymer is represented when $x$ in Formula I is one, and in this instance, a branched-chain formula may be postulated as follows:

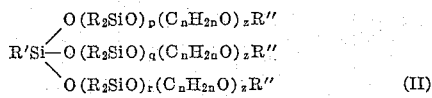
(II)

where $p+q+r=y$ of Formula I and has a minimum value of 3, the other subscripts being the same as in Formula I. In this instance, all three of the oxyalkylene chains are joined to the end of polysiloxane chains of the type —($R_2SiO$)—. A representative composition of the type of compounds or products characterized by Formula II above is a composition wherein the values of $p$, $q$ and $r$ are 6 and the $(C_nH_{2n}O)_z$ unit represents a mixed polyoxyethylene-oxypropylene block containing seventeen (17) oxyethylene units and thirteen (13) oxypropylene units and R″ represents a butyl group. Another composition of the class represented by Formula II above is a composition wherein the values of $p$, $q$ and $r$ are three (3) and the $(C_nH_{2n}O)_z$ unit represents a polyoxyethylene block containing sixteen (16) oxyethylene units and R″ represents a methyl group. Still another composition of the class described is a product wherein the values of $p$, $q$ and $r$ are three (3) and the $(C_nH_{2n}O)_z$ unit is a polyoxypropylene block containing from twelve (12) to thirteen (13) oxypropylene units and R″ represents a butyl group.

However, another type of branched-chain block copolymer exists when one of the oxyalkylene chains is attached through an oxygen atom to the trifunctional silicon atom bonded only to a single hydrocarbyl radical (R′). This formula may be given as follows:

$$R''(C_nH_{2n}O)_z(R_2SiO)_pO-\underset{\underset{O(C_nH_{2n}O)_zR''}{|}}{\overset{\overset{R'}{|}}{Si}}-O(R_2SiO)_q(C_nH_{2n}O)_zR''$$ (III)

where $p+q=y$ of Formula I and has a minimum value of 3.

Another type of block copolymer is represented when there are present therein two trifunctional silicon atoms each bonded to a single divalent hydrocarbon radical, and correspondingly present therein six polyoxyalkylene chains. Such block copolymers may be represented by the formula:

$$(O_3SiR'SiO_3)(R_2SiO)_y[(C_nH_{2n}O)_zR'']_6 \quad (IV)$$

wherein R, R″, $y$, $n$, and $z$ are as designated for Formula I and R′ is a divalent hydrocarbon radical. Expressed in structural form these block copolymers may be represented by the following formula:

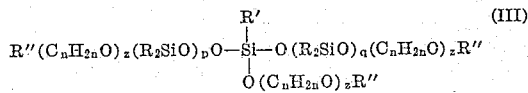
(V)

where $p+q+r+s+t+u$ is equal to $y$ of Formula I and in this instance, has a minimum value of 6.

The above-described siloxane-oxyalkylene block copolymers can be prepared in accordance with the procedures described and claimed in the copending application of D. L. Bailey and F. M. O'Connor, Serial No. 417,835, filed December 14, 1953, now U.S. Patent No. 2,834,748, issued May 13, 1958.

Other siloxane-oxyalkylene block copolymers which deserve mention are those corresponding to the general formula:

$$R'[(R_2SiO)_y]_a[(C_nH_{2n}O)_x]_bR'' \quad (VI)$$

where $y$ is an integer having a value of at least 2 and denotes the number of siloxane units; $n$ is an integer from 2 to 4 denoting the number of carbon atoms in the oxyalkylene group; $x$ is an integer having a value of at least 5 and denotes the length of the oxyalkylene chain; and $a$ and $b$ are integers whose sum is 2 or 3. R′ and R″ are chain-terminating monovalent hydrocarbyl or hydrocarbyloxy radicals, and may terminate a siloxane chain either by a hydrocarbyloxy group or by completing a trihydrocarbylsilyl group and may terminate an oxyalkylene chain with a hydrocarbyloxy group. It will be understood further that the compositions of matter are mixtures of such block copolymers wherein $x$ and $y$ are of different values and that methods of determining the chain length of the polysiloxane chains and the polyoxyalkylene chains give values which represent average chain lengths.

With reference to Formula VI above, it will be noted that there is at least one oxyalkylene chain or block joined to at least one siloxane chain or block through a Si—O—C bond, and different types of block copolymers are formed depending on the values of $a$ and $b$.

In one type there is one block of siloxane polymer ($a$ is 1) and two blocks of oxyalkylene polymer ($b$ is 2) and such type may be represented as follows:

$$R'O(C_nH_{2n}O)_x(R_2SiO)_y(C_nH_{2n}O)_xR'' \quad (VII)$$

where the subscripts are as defined in Formula VI above and R′ and R″ are monovalent hydrocarbyl radicals.

In another type of block copolymer, there is one block of oxyalkylene polymer ($b$ is 1) and two blocks of siloxane polymer ($a$ is 2) and this type may be represented as follows:

$$R''(R_2SiO)_y(C_nH_{2n}O)_x(R_2SiO)_{y-1}R_2SiR'' \quad (VIII)$$

where R′ and R″ are monovalent hydrocarbyl or hydrocarbyloxy radicals, and the other subscripts are as defined in Formula VI.

In a third type of block copolymer, there is one block of a siloxane polymer and one block of an oxyalkylene polymer ($a$ and $b$ both equal 1) and this type may be represented as follows:

$$R'(R_2SiO)_y(C_nH_{2n}O)_xR'' \quad (IX)$$

where R′ and R″ are monovalent hydrocarbyl or hydrocarbyloxy radicals.

The types of siloxane-oxyalkylene block copolymers represented by general Formulae VI through IX can be prepared in accordance with the procedures described and claimed in the copending application of D. L. Bailey and F. M. O'Connor, Serial No. 435,938, filed June 10, 1954, now U.S. Patent No. 2,917,480, issued December 15, 1959.

Still other polysiloxane-oxyalkylene surfactant systems which deserve mention are those containing the aforesaid copolymers characterized by the following general formula $$R'O[(C_nH_{2n}O)_y]_c[(R_2SiO)_x(C_nH_{2n}O)_y]_d[(R_2SiO)_x]_eR' \quad (X)$$

in which R′ is hydrogen when attached to oxyalkylene polymers and a monovalent alkyl group when attached to siloxane polymers; R is a monovalent hydrocarbyl group and which can be the same or different for all R's in the molecule; $x$ is an integer of 2 or more; $y$ is an integer of 5 or more; $n$ is an integer from 2 to 4; and $a$ and $b$ are integers each of which is equal to at least one; $c$ and $e$ are integers having a value of zero or one; and $d$ is an integer of a value of one or of a greater value. The symbol $R'$, as used in this formula, represents a monovalent chain-terminating group which is hydrogen when terminating an oxyalkylene block end of the copolymeric chain. When terminating a silicone block end of the copolymeric chain, $R'$ is an alkyl group. Whether or not the terminal groups are hydrogen or alkyl apparently has little if any influence on the important properties and utility as emulsifiers.

Included within the scope of Formula X are block copolymers wherein the integers $c$ and $e$ are both equal to zero and the integer is a value of one or more, the general formula of this type being:

$$R''O[(R_2SiO)_x(C_nH_{2n}A)]_dH \qquad (XI)$$

wherein $R''$ designates a monovalent alkyl group; $R$ represents a monovalent hydrocarbyl group; and $x$, $y$, $n$ and $d$ represent integers as defined in Formula X.

Referring to Formula X, a second type of organosilicone block copolymer is one in which $c$ equals one, $e$ equals zero and $d$ has a value of one or more, the general formula of this type being:

$$HO(C_nH_{2n}O)_y[(R_2SiO)_x(C_nH_{2n}O)_y]_dH \qquad (XII)$$

wherein $R$ designates a hydrocarbyl group; and $x$, $y$, $n$ and are integers having the same definitions as for those of like designations in Formula X.

A third type of organo-silicone block copolymer is characterized by siloxane blocks at each end of the copolymeric chain and can be represented by Formula X when $c$ is equal to zero, $e$ has a value of one and $d$ represents an integer of at least one. This type of block copolymer is more particularly illustrated by the general formula:

$$R''O[(R_2SiO)_x(C_nH_{2n}O)_y]_d(R_2SiO)_xR'' \qquad (XIII)$$

wherein $R$ designates a hydrocarbyl group; $R''$ is an alkyl group; and $x$, $y$, $n$ and $d$ are integers having the same value as provided for in Formula X.

The polysiloxane-oxyalkylene block copolymer emulsifiers, characterized by Formula X through XIII can be prepared according to the procedures described and claimed in the copending application of D. L. Bailey and F. M. O'Connor, Serial No. 661,009, filed May 23, 1957, now abandoned.

Another group of polysiloxane-oxyalkylene block copolymer surfactant systems which deserve mention are mixtures of block copolymers wherein each copolymer contains at least one siloxane polymer and at least one oxyalkylene polymer in combination, the siloxane polymer being comprised of at least one trifunctional silicon atom bonded to three oxygen atoms and a hydrocarbyl group and joined to at least one oxyalkylene polymer through a carbon-oxy-silicon bond and the oxyalkylene polymer being composed of at least 5 oxyalkylene units joined to each other by oxycarbon bonds and joined at least at one end to a siloxane polymer through a carbon-oxy-silicon bond.

These compounds can be prepared according to the procedures described and claimed in the copending application of D. L. Bailey and F. M. O'Connor, Serial No. 660,997, filed May 23, 1957.

In addition, it has been found desirable to add to the siloxane-oxyalkylene surfactant systems, small quantities of hydrocarbyl silicone oils, such as dimethyl silicone oils. It appears that certain beneficial effects can be obtained, such as a more complete regulation of the number and size of the open cells in the foam. Normally, the dimethyl silicone oils employed are those having viscosities from 10 to 1000 centistokes.

In preparing the resinous stable foams in accordance with the practice of this invention, either batchwise or continuously, a polyether, a polyisocyanate or polyisothiocyanate, a foaming or blowing agent such as water, an organo-tin catalyst of the type described and a siloxane-oxyalkylene surfactant are mixed directly in a suitable container and allowed to react at room temperature. In a matter of minutes, the reaction mixture begins to foam and can be transferred to a mold, if desired. In reacting the ingredients described above, an excess of polyisocyanate or polyisothiocyanate with regard to the polyether is normally employed. Preferably, an amount of from 1.5 to 6.0 mols of polyisocyanate or polyisothiocyanate per mol of polyether is employed.

The amount of organo-tin catalyst of the type described above, necessary for the foaming reaction, is not necessarily critical. Amounts of catalyst that have been found suitable for use in producing foamed resins of good quality are amounts in the range of from 0.1 to 1.0, and preferably from 0.2 to 0.5 percent by weight based on the weight of polyether, polyisocyanate or polyisothiocyanate, water and siloxane-oxyalkylene emulsifier.

The amount of water employed in the process of this invention should be an amount sufficient to decompose the isocyanate to produce carbon dioxide in situ for forming the voids of the final foamed product. The formation of a good foam depends upon a simultaneous development of carbon dioxide and a cross-linking of the molecules to trap carbon dioxide and thus prevent collapse of the foam. Depending on the desired density of the foam and the amount of cross-linking desired, the amount of water added should be such that the ratio of equivalents of hydroxyl groups to equivalents of isocyanate or isothiocyanate is in the range of from 0.5:1.0 to 1.5:1.0 and preferably within the range of from about 0.8:1.0 to 1.2:1.0. Alternatively other foaming or blowing agents can be readily employed such as a liquified fluorocarbon or mixtures of liquified fluorocarbons or mixtures of water and liquid fluorocarbons which preferably vaporize at or below the temperature of the foaming reaction product. Fluorocarbons that find utility include compounds such as trichloromonofluoromethane; dichlorodifluoromethane, dichlorofluoromethane, 1,1-dichloro-1-fluoroethane; 1-chloro-1,1-difluoro, 2,2-dichloroethane; and 1,1-1-trifluoro, 2-chloro-2-fluoro, 3,3-difluoro, 4,4-4-trifluorobutane. The amount of blowing or foaming agent used will vary with density desired in the foaming product. In general it may be stated that for 100 grams of resin mix containing an average NCO/OH ratio of 1 to 1, about 0.005 to 0.3 mole of gas are used to provide densities ranging from 30 to 1 lbs. per cubic foot. If desired, water may be used in conjunction with the fluorocarbon.

The amount of siloxane-oxyalkylene copolymer normally employed in the emulsifier systems for producing foams of good stability are amounts ranging from 0.1 to 1.0 percent by weight based on the weight of the ingredients of the recipe, that is, polyether, polyisocyanate, polyisothiocyanate, a foaming or blowing agent such as water and catalyst. It is preferred, however, to employ an amount of emulsifier in the range of from 0.3 to 0.8 part by weight based on the weight of the ingredients of the recipe.

The foamed resins produced in accordance with the practice of this invention can be characterized or described as tin-catalyzed reaction products of polyethers and polyisocyanates or polyisothiocyanates which possess compressive strengths somewhat higher than those of "pre-polymer" foams of comparable compositions. While not wishing to be bound by any particular theory or explanation, it is believed that the foamed polyether-polyisocyanate reaction products are characterized by the presence therein of a mer defined by the general formula:

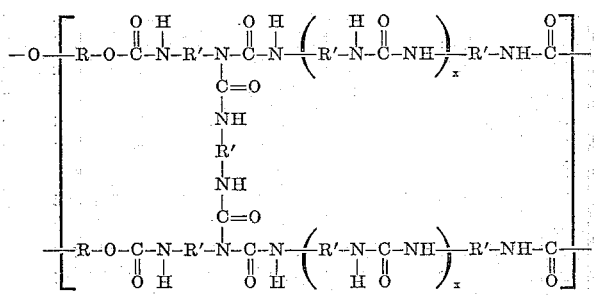

wherein R represents a polyether residue, R' represents isocyanate residues, and $x$ represents a positive integer in the range of from 0-5. Preferably $x$ represents an integer of from 3 to 4 which would yield flexible foams of desirably low density.

As may be readily observed, the simplest polymeric unit possesses *one* urethane linkage

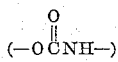

for every urylene (—NH—C—NH—) linkage. This explanation is based on the fact that in the "prepolymer" process, discussed above, one mol of polyether is first reacted with one mol of diisocyanate to yield a linear polymeric polyurethane structure wherein the polymeric chain is connected by urethane linkages

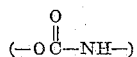

Subsequently, when the "prepolymer" mixture containing an excess isocyanate, is reacted with water in the presence of a catalyst, first urylene links

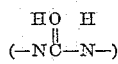

are produced, secondly, either the urethane links or the urylene links will react with isocyanate to result in cross-linking. Since urylene links are known to react with isocyanates about 100 times faster than urethane links, this cross-linking reaction must take place predominantly via urylene links. Therefore, in contrast to the process of the present invention, represented by the above structure, the "prepolymer" process will yield a smaller number of large polymer rings connected to one another whereas the present process yields a larger number of smaller polymer rings connected to one another. A polymer system containing a large number of smaller rings, which are more closely packed than would be possible with the large rings of the "prepolymer process," should be expected, for example in the case of a foam, to possess superior compressive strength.

Thus, prepolymer foams would be expected to possess lower compressive strengths than foams of the instant invention. This indeed appears to be substantiated since when foamed resins of this invention were compared with foamed resins prepared by the commercial "prepolymer" technique of comparable compositions, the following differences in compressive and tensile strengths were observed:

THE FOAMED RESIN PREPARED ACCORDING TO THE "PREPOLYMER" TECHNIQUE

A conventional prepolymer was prepared by reacting polypropylene glycol having a molecular weight of about 1900, a small amount of trimethylol propane, and a stoichiometric quantity of a 80:20 mixture of 2,4- and 2,6-isomers of tolylene diisocyanate at a temperature of about 100–120° C. for about two hours. The prepolymer was recovered and additional isocyanate was added to provide an NCO content of 9.5 percent by weight based on the weight of the composition.

One hundred parts of the prepolymer composition, 1.0 part of N-methyl morpholine, 0.2 part of triethylamine, 0.5 part of a dimethyl polysiloxane oil having a viscosity of 50 centistokes and 2.3 parts of water, were mixed and allowed to foam. After the mixture is foamed completely the foamed product is subjected to a post cure at a temperature of 250° F. for several hours. The foamed product was characterized by the following physical properties:

Density, lbs./ft.³ _____ 2.62
Tensile strength, p.s.i. _____ 11.0
Compression load, p.s.i.:
    25% deflection _____ 0.21
    50% deflection _____ 0.32
Compression set, percent _____ 20.7

A second conventional prepolymer was prepared by reacting polypropylene glycol having a molecular weight of about 1900, 2 grams of 1,2,6-hexanetriol, and a stoichiometric amount of an 80:20 mixture of 2,4- and 2,6-isomers of tolylene diisocyanate at 120° C. for 2 hours. Additional isocyanate was then added to provide an NCO content of 9.1 percent by weight based on the weight of the composition and heating was continued for 1 hour at 120° C. The resulting prepolymer possessed a viscosity of 14,300 centipoises at 25° C.

One hundred parts of the prepolymer composition, 1.0 part of N-methylmorpholine, 0.3 part of triethylamine, 0.5 part of a dimethylpolysiloxane oil having a viscosity of 50 centistokes and 2.3 parts of water, were mixed and allowed to foam. The foam was subjected to a 15 minute precure at 170° F., fluxed and post cured for 3 hours at 250° F. The foamed product was characterized by the following physical properties:

Density, lbs./ft.³ _____ 2.80
Tensile strength, p.s.i. _____ 15.4
Compression load, p.s.i.:
    25% deflection _____ 0.40
    50% deflection _____ 0.56
Compression set, percent _____ 6.5

THE FOAMED RESIN PREPARED ACCORDING TO THE PRESENT INVENTION

A foamed resin prepared by reacting 100 parts of polypropylene glycol having a molecular weight of 2075, 2 parts of 1,2,6-hexanetriol, 2 grams of water, 38.5 parts of an 80:20 mixture of 2,4- and 2,6-isomers of tolylene diisocyanate, 0.53 part of dibutyltin dilaurate and 0.53 part of a copolymer of triethoxy dimethylpolysiloxane having a molecular weight of 1524 and butoxy end-blocked polyethylene glycol having a molecular weight of 1500.

The ingredients were thoroughly mixed, transferred to a mold and allowed to foam. The foamed product was allowed to stand at room temperature for 24 hours. The foamed resin was characterized by the following physical properties:

Density, lbs./ft.³ _____ 2.66
Tensile strength, p.s.i. _____ 24.0
Compression load, p.s.i.:
    25% deflection _____ 0.52
    50% deflection _____ 0.70
Compression set, percent _____ 4.9

As may be readily observed, the foamed resin prepared according to the process of this invention possess, at a particular density tensile strength of the order of from 100 to 300 percent higher and compression set of about ⅙ that of comparable compositions prepared from the "prepolymer."

In addition, it should be noted that it is not necessary to subject the foamed resins of this invention to the high temperature heat cure necessary for the preparation of stable foams according to the "prepolymer" technique.

The process of the invention admits of numerous variations and innovations, all of which are within the scope of the invention and should not be limited except as defined in the appended claims. For example, one embodiment of this invention is directed to water-foamable compositions comprising a polyalkylene ether glycol, a polyisocyanate or polyisothiocyanate, an organo-tin catalyst of the class described and a polysiloxane-oxyalkylene copolymer surfactant.

Further novel embodiments include polyols and preferably the polyether polyols herein described containing a minor amount and at least 0.1 percent by weight based on the polyol of a polysiloxane-oxyalkylene copolymer of the type herein described.

It is also within the scope of the invention to add fillers, such as clays or diatomaceous earths in quantities up to 20 percent by weight based on the weight of total ingredients. Dyes may also be added to the basic foam recipe and, in some instances, are desirable since polyurethane foams normally exhibit a slight tendency to yellow on ageing The following examples will serve to illustrate the novel embodiments of the invention and the process for their preparation. In the following examples, the polysiloxane-oxyalkylene surfactant compositions have been described in terms of their compositions and are represented by Formula II supra.

*Example 1*

A recipe was prepared comprising:
(a) 100 grams of a polyether prepared by the reaction of propylene oxide and 1,2,6-hexanetriol and having a hydroxyl number of 113.0 and a carboxyl number of 0.19 were thoroughly mixed with,
(b) 42 grams of 65:35 mixture of 2,4- and 2,6-tolylene diisocyanate containing 0.14 percent "Ethocell" an ethoxylated cellulose produced by reacting ethyl chloride with ethyl cellulose,
(c) 2.5 grams of water,
(d) 0.5 gram of dibutyltin dilaurate,
(e) 0.5 gram of a copolymer of triethoxy end blocked branched chain dimethylpolysiloxane having a molecular weight of 858 and a methoxy end-block polyoxyethylene glycol having a molecular weight of 750 (as represented by Formula II, supra, wherein $p$, $q$, and $r$ each have an average value of three (3), the $(C_nH_{2n}O)_z$ unit is a polyoxyethylene block containing an average of sixteen (16) oxyethylene units and R'' represents a methyl group).

The mixture was stirred and transferred to an open mold as soon as it started to foam. The foam was removable from the mold after 15 minutes indicating a highly efficient curing reaction. The foam was characterized by the following physical properties:

Density, lbs./cu. ft. _____ 3.28
Tensile strength, p.s.i. _____ 15.0
Compression load at 25% elongation, p.s.i. _____ 0.89
Compression load at 50% elongation, p.s.i. _____ 1.14
Compression set, percent _____ 10.2

*Example 2*

A recipe was prepared comprisng:
(a) 100 grams of the polyether referred to in Example 1,
(b) 42 grams of 65:35 mixture of 2,4- and 2,6-isomers of tolylene diisocyanate containing 0.14 percent "Ethocell,"
(c) 2.5 grams of water,
(d) 0.6 gram of dibutyltin dilaurate,
(e) 0.5 gram of a copolymer of triethoxy end blocked branched chain dimethylpolysiloxane having a molecular weight of 1524 and butoxy end blocked polyoxyethyleneoxypropylene glycol having a molecular weight of 1500 (as represented by Formula II, supra, wherein $p$, $q$, and $r$ each have an average value of six (6), the $(C_nH_{2n}O)_z$ unit represents a mixed polyoxyethyleneoxpyropylene block containing an average of seventeen (17) oxyethylene untis and thirteen (13) oxypropylene units and R'' represents a butyl group).

The mixture was transferred to a mold as soon as it started to foam. The resulting foam was characterized by the following physical properties:

Density, lbs./cu. ft. _____ 3.26
Tensile strength, p.s.i. _____ 14.0
Compression load at 25% defl., p.s.i. _____ 0.73
Compression load at 50% defl., p.s.i. _____ 0.96
Compression set, percent _____ 9.6

*Example 3*

A recipe was prepared comprising:
(a) 150 grams of the polyether described in Example 1,
(b) 63.5 grams of 65:35 mixture of 2,4- and 2,6-isomers of tolylene diisocyanate containing 0.14 percent "Ethocell,"
(c) 3.75 grams of water,
(d) 0.8 gram of dibutyltin diacetate,
(e) 0.7 gram of the surfactant composition of Example 2, The mixture was transferred to an open mold as soon as it began to foam. The resulting foam was characterized by the following physical properties:

Density, lbs./cu. ft. _____ 2.81
Tensile strength, p.s.i. _____ 12.0
Compression load at 25% deflection, p.s.i. _____ 0.40
Compression load at 50% deflection, p.s.i. _____ 0.57
Compression set, percent _____ 10.6

*Example 4*

A recipe was prepared comprising:
(a) 150 grams of polypropylene glycol having a molecular weight of 1900, a hydroxyl number of 58.5 and a carboxyl number of 0.15, 3 grams of 1,2,6-hexanetriol,
(b) 60 grams of a 65:35 mixture of 2,4- and 2,6-isomers of tolylene diisocyanate (containing 0.13 percent "Ethocell"),
(c) 3.75 grams of water,
(d) 0.7 gram of dibutyltin diacetate,
(e) 0.75 gram of a copolymer of triethoxy end blocked branched chain dimethylpolysiloxane having a molecular weight of 1524 and butoxy end-blocked polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R'' represents a butyl group).

As soon as the mixture began to foam, it was transferred to an open mold and after a period of one hour, the resulting foam could be removed from the mold. The resulting foam was characterized by the following physical properties:

Density, lbs./cu. ft. _____ 2.93
Tensile strength, p.s.i. _____ 17.0
Compression load at 25% deflection, p.s.i. _____ 0.54
Compression load at 50% deflection, p.s.i. _____ 0.73
Compression set, percent _____ 10.3

*Example 5*

A recipe was prepared comprising:
(a) 150 grams of polypropylene glycol having a molecular weight of 1900, a hydroxyl number of 58.5 and a carboxyl number of 0.15 and 3 grams of 1,2,6-hexanetriol,
(b) 57 grams of a 80:20 mixture of 2,4- and 2,6-isomers of tolylene diisocyanate,
(c) 3.75 grams of water,
(d) 0.5 gram of dibutyltin diacetate,
(e) 0.5 gram of a copolymer of triethoxy end blocked branched chain dimethylpolysiloxane having a molecular weight of 1524 and butoxy end-blocked polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R" represents a butyl group).

The mixture was stirred vigorously until it began to foam. The mixture was then transferred to an open mold and allowed to foam. The resulting foam was characterized by the following physical properties:

| | |
|---|---|
| Density, lbs./cu. ft. | 2.17 |
| Tensile strength, p.s.i. | 14.0 |
| Compression load at 25% deflection, p.s.i. | 0.32 |
| Compression load at 50% deflection, p.s.i. | 0.41 |
| Compression set, percent | 20.2 |

*Example 6*

A recipe was prepared comprising:
(a) 150 grams of a copolymer of propylene oxide and ethylene oxide containing 10 percent polyethylene oxide and having a molecular weight of 2020, a hydroxyl number of 55.6 and a carboxyl number of 0.09 and 3 grams of 1,2,6-hexanetriol,
(b) 55 grams of a 65:35 mixture of 2,4- and 2,6-isomers of tolylene diisocyanate containing 0.14 percent "Ethocell,"
(c) 3.75 grams of water,
(d) 0.5 gram of dibutyltin diacetate,
(e) 1.2 grams of a copolymer of triethoxy end blocked branched chain dimethylpolysiloxane having a molecular weight of 1524 and butoxy end-blocked polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R" represents a butyl group).

The mixture was stirred vigorously until it began to foam. The mixture was then transferred to an open mold and allowed to foam. The resulting foam was characterized by the following physical properties:

| | |
|---|---|
| Density, lbs./cu. ft. | 3.01 |
| Tensile strength, p.s.i. | 10.0 |
| Compression load at 25% deflection, p.s.i. | 0.43 |
| Compression load at 50% deflection, p.s.i. | 0.57 |
| Compression set, percent | 19.0 |

*Example 7*

A recipe was prepared comprising:
(a) 150 grams of polypropylene glycol having a molecular weight of 1900, a hydroxyl number of 58.5 and a carboxyl number of 0.15, and 3 grams of 1,2,6-hexanetriol,
(b) 58 grams of a 80:20 mixture of 2,4- and 2,6-isomers of tolylene diisocyanate,
(c) 3.75 grams of water,
(d) 0.69 gram of dibutyltin dilaurate,
(e) 0.79 gram of a copolymer of triethoxy end blocked branched chain dimethylsiloxane having a molecular weight of 1524 and butoxy end-blocked polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R" represents a butyl group).

The mixture was vigorously stirred until it began to foam. As soon as the mixture began foaming, was transferred to an open mold and allowed to cure. The resulting foam was characterized by the following physical properties:

| | |
|---|---|
| Density, lbs./cu. ft. | 2.56 |
| Tensile strength, p.s.i. | 17.0 |
| Compression load at 25% deflection, p.s.i. | 0.40 |
| Compression load at 50% deflection, p.s.i. | 0.51 |

*Example 8*

A recipe was prepared comprising:
(a) 150 grams of polypropylene glycol having a molecular weight of 1900, a hydroxyl number of 58.5 and a carboxyl number of 0.185 and 3 grams of 1,2,6-hexanetriol,
(b) 58 grams of 80:20 mixture of 2,4- and 2,6-isomers of tolylene diisocyanate,
(c) 3.75 grams of water,
(d) 0.3 gram of di-2-ethylhexyltin oxide,
(e) 0.6 gram of a copolymer of triethoxy end blocked branched chain dimethylpolysiloxane having a molecular weight of 1524 and butoxy end-blocked polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R" represents a butyl group).

The mixture was stirred vigorously until it began to foam. As soon as the mixture began foaming, it was transferred to an open mold and the resulting foam was characterized by the following physical properties:

| | |
|---|---|
| Density, lbs./cu. ft. | 2.72 |
| Tensile strength, p.s.i. | 16.0 |
| Compression load at 25% deflection, p.s.i. | 0.38 |
| Compression load at 50% deflection, p.s.i. | 0.51 |

*Example 9*

A recipe was prepared comprising:
(a) 150 grams of polypropylene glycol having a molecular weight of 1900, a hydroxyl number of 58.5 and a carboxyl number of 0.15, and 3 grams of 1,2,6-hexanetriol,
(b) 65 grams of a 80:20 mixture of 2,4- and 2,6-isomers of tolylene diisocyanate,
(c) 3.75 grams of water,
(d) 0.8 gram of dibutyltin dilaurate,
(e) 0.9 gram of a copolymer of triethoxy end blocked branched chain dimethylpolysiloxane having a molecular weight of 1524 and butoxy end-block polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R" represents a butyl group).

The reactant was stirred until the mixture began to foam, whereupon it was transferred to an open mold and allowed to cure. The resulting foam was characterized by the following physical properties:

| | |
|---|---|
| Density, lbs./cu. ft. | 2.37 |
| Tensile strength, p.s.i. | 17.0 |
| Compression load at 25% deflection, p.s.i. | 0.57 |
| Compression load at 50% deflection, p.s.i. | 0.76 |

*Example 10*

A recipe was prepared comprising:
(a) 100 grams of a triol adduct of propylene oxide started with 1,2,6-hexanetriol having a molecular weight of about 1500, a hydroxyl number of 113, a carboxyl number of 0.19, and 0.083 percent water,
(b) 42 grams of an 80:20 mixture of 2,4- and 2,6-isomers of tolylene diisocyanate,
(c) 2.5 grams of water,
(d) 0.4 gram of di-n-butyltin diacetate,
(e) 0.5 gram of a copolymer comprising the condensation product of a triethoxy end-blocked branched chain dimethylpolysiloxane having one ethoxy group per terminal silicon atom and having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R" represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.95.
Tensile strength, lbs./in.$^2$ _____ 13.0.
Compression set, percent _____ 9.25.
Compression load, lbs./in.$^2$, 25%; 50% __ 0.542; 0.733.

*Example 11*

A recipe was prepared comprising:
(a) 150 grams of a triol adduct of propylene oxide started with 1,2,6-hexanetriol having a molecular weight of about 1500, a hydroxyl number of 113, a carboxyl number of 0.19, and 0.083 percent of water,
(b) 63 grams of an 80:20 mixture of 2,4- and 2,6-isomers of tolylene diisocyanate,
(c) 3.75 grams of water,
(d) 0.6 gram of dioctyltin oxide,
(e) 1.2 grams of a copolymer comprising the condensation product of a triethoxy end-blocked branched chain dimethylpolysiloxane having one ethoxy group per terminal silicon atom having a molecular weight of 1524 and polyoxy ethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.70.
Tensile strength, lbs./in.$^2$ _____ 13.0.
Compression set, percent _____ 2.65.
Compression load, lbs./in.$^2$, 25%; 50% ___ 0.414; 0.529.

*Example 12*

A recipe was prepared comprising:
(a) 150 grams of the triol adduct of propylene oxide started with glycerol having a molecular weight of 2300, a hydroxyl number of 72.0 and a carboxyl number of 0.18,
(b) 53 grams of an 80:20 mixture of 2,4- and 2,6-isomers of toluene diisocyanate,
(c) 3.75 grams of water,
(d) 0.9 gram of dibutyltin dilaurate
(e) 0.9 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.71.
Tensile strength, lbs./in.$^2$ _____ 11.0.
Compression set, percent _____ 19.6.
Compression load, lbs./in.$^2$, 25%; 50% ___ 0.414; 0.545.

*Example 13*

A recipe was prepared comprising:
(a) 150 grams of the triol adduct of propylene oxide started with glycerol having a molecular weight of 2300, a hydroxyl number of 72.0 and a carboxyl number of 0.18,
(b) 61 grams of an 80:20 mixture of 2,4- and 2,6-isomers of toluene diisocyanate,
(c) 3.75 grams of water,
(d) 0.8 gram of dibutyltin monolaurate,
(e) 0.9 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represent a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.37.
Tensile strength, lbs./in.$^2$ _____ 11.0.
Compression set, percent _____ 9.52.
Compression load, lbs./in.$^2$, 25%; 50% __ 0.459; 0.590.

*Example 14*

A recipe was prepared comprising:
(a) 150 grams of the triol adduct of propylene oxide started with glycerol having a molecular weight of 2300, a hydroxyl number of 72.0 and a carboxyl number of 0.18,
(b) 62 grams of an 80:20 mixture of 2,4- and 2,6-isomers of tolylene diisocyanate,
(c) 3.75 grams of water,
(d) 0.8 gram of dibutyltin dilaurate,
(e) 0.9 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.51.
Tensile strength, lbs./in.$^2$ _____ 13.0.
Compression set, percent _____ 9.5.
Compression load, lbs./in.$^2$, 25%; 50% ___ 0.520; 0.679.

*Example 15*

A recipe was prepared comprising:
(a) 150 grams of polypropylene glycol having a molecular weight of 1900, a hydroxyl number of 58.5, a carboxyl number of 0.15 and containing 0.13 percent water and 3 grams of 1,2,6-hexanetriol,
(b) 58 grams of an 80:20 mixture of 2,4- and 2,6-isomers of tolylene diisocyanate,
(c) 3.75 grams of water,
(d) 0.6 gram of dibutyltin dilaurate,
(e) 0.7 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.36.
Tensile strength, lbs./in.$^2$ _____ 15.0.
Compression set, percent _____ 19.6.
Compression load, lbs./in.$^2$ _____ 0.334; 0.430.

*Example 16*

A recipe was prepared comprising:
(a) 150 grams of polypropylene glycol having a molecular weight of 1900, a hydroxyl number of 58.5, a carboxyl number of 0.15 and containing 0.13 percent water and 3 grams of 1,2,6-hexanetriol,
(b) 58 grams of an 80:20 mixture of 2,4- and 2,6-isomers of tolylene diisocyanate,
(c) 3.75 grams of water,
(d) 0.6 gram of dibutyltin dilaurate,
(e) 0.7 gram of copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R'' represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.56.
Tensile strength, lbs./in.$^2$ _____ 17.0.
Compression set, percent _____ 9.85.
Compression load, lbs./in.$^2$, 25%; 50% ___ 0.398; 0.513.

*Example 17*

A recipe was prepared comprising:
(a) 100 grams of polypropylene glycol having a molecular weight of 1900, a hydroxyl number of 58.5, a carboxyl number of 0.15 and containing 0.13 percent water and 50 grams of the triol adduct of propylene oxide started with glycerol having a molecular weight of 2300, a hydroxyl number of 72.0 and a carboxyl number of 0.18.
(b) 59 grams of an 80:20 mixture of 2,4- and 2,6-isomers of tolylene diisocyanate,
(c) 3.75 grams of water,
(d) 0.9 gram of dibutyltin dilaurate,
(e) 0.9 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R'' represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.54.
Tensile strength, lbs./in.$^2$ _____ 19.0.
Compression set, percent _____ 11.6.
Compression load, lbs./in.$^2$, 25%; 50% ___ 0.459; 0.640.

*Example 18*

A recipe was prepared comprising:
(a) 112.5 grams of polypropylene glycol having a molecular weight of 1900, a hydroxyl number of 58.5, a carboxyl number of 0.15 and containing 0.13 percent water and 50 grams of the triol adduct of propylene oxide started with glycerol having a molecular weight of 2300, a hydroxyl number of 72.0 and a carboxyl number of 0.18,
(b) 51 grams of an 80:20 mixture of 2,4- and 2,6-isomers of tolylene diisocyanate,
(c) 3.75 grams of water,
(d) 0.9 gram of dilbutyltin dilaurate,
(e) 0.9 gram of a copolymer comprising the condensation product of triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R'' represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.88.
Tensile strength, lbs./in.$^2$ _____ 20.0.
Compression set, percent _____ 8.89.
Compression load, lbs./in.$^2$, 25%; 50% _ 0.542; 0.070.

*Example 19*

A recipe was prepared comprising:
(a) 100 grams of polypropylene glycol having a molecular weight of 1900, a hydroxyl number of 58.5, a carboxyl number of 0.15 and containing 0.13 percent water and 50 grams of a triol adduct of propylene oxide started with glycerol having a molecular weight of 2300, a hydroxy number of 72.0 and a carboxyl number of 0.18,
(b) 58 grams of an 80:20 mixture of 2,4- and 2,6-isomers of tolylene diisocyanate,
(c) 3.75 grams of water,
(d) 0.9 gram of dibutyltin dilaurate,
(e) 0.9 gram of a copolymer comprising the condensation product of a triethoxy end-blocked branched chain dimethylpolysiloxane having a molecular weight of 1524 and polyoxyethylene glycol having a molecular weight of 1500 (as represented by formula II, supra, wherein $p$, $q$ and $r$ each have an average value of six (6), the $(C_nH_{2n}O)_z$ unit represents a polyoxyethylene block containing an average thirty-four (34) oxyethylene units and R'' represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.69.
Tensile strength, lbs./in.$^2$ _____ 13.0.
Compression set, percent _____ 7.78.
Compression load, lbs./in.$^2$, 25%; 50% __ 0.682; 0.860.

*Example 20*

A recipe was prepared comprising:
(a) 75 grams of polypropylene glycol having a molecular weight of 1900, a hydroxyl number of 58.5, a carboxyl number of 0.15 and containing 0.13 percent water and 75 grams of the triol adduct of propylene oxide started with glycerol having a molecular weight of 2300, a hydroxyl number of 72.0 and a carboxyl number of 0.18,
(b) 58 grams of an 80:20 mixture of 2,4- and 2,6-isomers of tolylene diisocyanate,
(c) 3.75 grams of water,
(d) 0.7 gram of dibutyltin dilaurate,
(e) 0.8 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./ft.³ | 2.49. |
| Tensile strength, lbs./in.² | 18.0. |
| Compression set, percent | 7.81. |
| Compression load, lbs./in.², 25%; 50% | 0.615; 0.732. |

*Example 21*

A recipe was prepared comprising:
(a) 75 grams of polypropylene glycol having a molecular weight of 1900, a hydroxyl number of 58.5, a carboxyl number of 0.15 and containing 0.13 percent water and 75 grams of the triol adduct of propylene oxide started with glycerol having a molecular weight of 2300, a hydroxyl number of 72.0 and a carboxyl number of 0.18,
(b) 58 grams of an 80:20 mixture of 2,4- and 2,6- isomers of tolylene diisocyanate,
(c) 3.75 grams of water,
(d) 0.4 gram of dioctyltin oxide,
(e) 0.8 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foam mixture cured in a matter of minutes and was characterized by the following physical properties:

| | |
|---|---|
| Density, lbs./ft.³ | 2.72. |
| Tensile strength, lbs./in.² | 17.0. |
| Compression set, percent | 6.02. |
| Compression load, lbs./in.², 25%; 50% | 0.605; 0.780. |

*Example 22*

A recipe was prepared comprising:
(a) 112.5 grams of polypropylene glycol having a molecular weight of 1900, a hydroxyl number of 58.5, a carboxyl number of 0.15 and containing 0.13 percent water and 37.5 grams of the triol adduct of propylene oxide started with 1,2,6-hexanetriol having a molecular weight of 3800, a hydroxyl number of 44.2, a carboxyl number of 0.05 and 0.10 percent water,
(b) 57 grams of an 80:20 mixture of 2,4- and 2,6- isomers of tolylene diisocyanate,
(c) 3.75 grams of water,
(d) 1.0 gram of dibutyltin dilaurate,
(e) 0.9 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./ft.³ | 3.30. |
| Tensile strength, lbs./in.² | 27.0. |
| Compression set, percent | 7.1. |
| Compression load, lbs./in.², 25%; 50% | 0.987; 1.26. |

*Example 23*

A recipe was prepared comprising:
(a) 100 grams of polypropylene glycol having a molecular weight of 1900, a hydroxyl number of 58.5, a carboxyl number of 0.15 and containing 0.13 percent water and 50 grams of the triol adduct of propylene oxide started with 1,2,6-hexanetriol having a molecular weight of 3800, a hydroxyl number of 44.2, a carboxyl number of 0.05 and 0.10 percent water,
(b) 56.0 grams of an 80:20 mixture of 2,4- and 2,6- isomers of tolylene diisocyanate,
(c) 3.75 grams of water,
(d) 1.0 gram of dibutyltin dilaurate,
(e) 0.9 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./ft.³ | 2.76. |
| Tensile strength, lbs./in.² | 20.0. |
| Compression set, percent | 7.72. |
| Compression load, lbs./in.², 25%; 50% | 0.765; 0.981. |

*Example 24*

A recipe was prepared comprising:
(a) 112.5 grams of polypropylene glycol having a molecular weight of 1900, a hydroxyl number of 58.5, a carboxyl number of 0.15 and containing 0.13 percent water and 37.5 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash, percent | .25 |
| Average molecular weight | 3629 |
| Hydroxyl number | 61.8 |
| Acid number | Nil |
| Gel test, seconds | 6 |
| pH 10:1 aqueous isopropanol | 9.10 |
| pH 10:6 aqueous isopropanol | 9.55 |
| Color, Gardner | 3.5 |
| Unsaturation, meq./gm. | .015 |

(b) 50.5 grams of an 80:20 mixture of 2,4- and 2,6- isomers of tolylene diisocyanate,
(c) 3.75 grams of water,
(d) 0.6 gram of dibutyltin dilaurate,
(e) 0.9 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./ft.$^3$ | 2.57. |
| Tensile strength, lbs./in.$^2$ | 13.0. |
| Compression set, percent | 11.2. |
| Compression load, lbs./in.$^2$, 25%; 50% | 0.354; 0.465. |

*Example 25*

A recipe was prepared comprising:

(a) 100 grams of polypropylene glycol having a molecular weight of 1900, a hydroxyl number of 58.5, a carboxyl number of 0.15 and containing 0.13 percent water and 50 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash, percent | .25 |
| Average molecular weight | 3629 |
| Hydroxyl number | 61.8 |
| Acid number | Nil |
| Gel test, seconds | 6 |
| pH 10:1 aqueous isopropanol | 9.10 |
| pH 10:6 aqueous isopropanol | 9.55 |
| Color, Gardner | 3.5 |
| Unsaturation, meq./gm. | .015 |

(b) 50.5 grams of an 80:20 mixture of 2,4- and 2,6-isomers of tolylene diisocyanate, (c) 3.75 grams of water, (d) 0.7 gram of dibutyltin dilaurate, (e) 1.0 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./ft.$^3$ | 2.74. |
| Tensile strength, lbs./in.$^2$ | 12.0. |
| Compression set, percent | 12.0. |
| Compression load, lbs./in.$^2$, 25%; 50% | 0.465; 0.615. |

*Example 26*

A recipe was prepared comprising:

(a) 100 grams of polypropylene glycol having a molecular weight of 1900, a hydroxyl number of 58.5, a carboxyl number of 0.15 and containing 0.13 percent water and 50 grams of a polyether polyol block polymer prepared from propylene oxide and ethylene oxide using ethylene diamine as a starter and containing 10 percent polyoxyethylene characterized by the following physical properties:

| | |
|---|---|
| Specific gravity at 20/20° C. | 1.0260 |
| Water, percent | .06 |
| Volatility, percent | .19 |
| Ash, percent | .25 |
| Average molecular weight | 3629 |
| Hydroxyl number | 61.8 |
| Acid number | Nil |
| Gel test, seconds | 6 |
| pH 10:1 aqueous isopropanol | 9.10 |
| pH 10:6 aqueous isopropanol | 9.55 |
| Color, Gardner | 3.5 |
| Unsaturation, meq./gm. | .015 |

(b) 58 grams of an 80:20 mixture of 2,4- and 2,6-isomers of tolylene diisocyanate, (c) 3.75 grams of water, (d) 0.6 gram of dibutyltin dilaurate, (e) 0.9 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./ft.$^3$ | 2.32. |
| Tensile strength, lbs./in.$^2$ | 10.0. |
| Compression set, percent | 10.0. |
| Compression load, lbs./in.$^2$, 25%; 50% | 0.459; 0.583. |

*Example 27*

A recipe was prepared comprising:

(a) 100 grams of polypropylene glycol having a molecular weight of 1900, a hydroxyl number of 58.5, a carboxyl number of 0.15 and containing 0.13 percent water and 15 grams of a triol adduct of propylene oxide started with 1,2,6-hexanetriol having a molecular weight of about 1500, a hydroxyl number of 113, a carboxyl number of 0.19, and 0.083 percent water, (b) 64 grams of an 80:20 mixture of 2,4- and 2,6-isomers of tolylene diisocyanate, (c) 3.75 grams of water, (d) 0.8 gram of dibutyltin dilaurate, (e) 0.8 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./ft.$^3$ | 2.30. |
| Tensile strength, lbs./in.$^2$ | 10.0. |
| Compression set, percent | 12.4. |
| Compression load, lbs./in.$^2$, 25%; 50% | 0.309; 0.420. |

Example 28

A recipe was prepared comprising:

(a) 110 grams of polypropylene glycol having a molecular weight of 1900, a hydroxyl number of 58.5, a carboxyl number of 0.15 and containing 0.13 percent water and 40 grams of a triol adduct of propylene oxide started with 1,2,6-hexanetriol having a molecular weight of 700, a carboxyl number of 0.03, a hydroxyl number of 243.0 and containing 0.09 percent water, (b) 62.0 grams of an 80:20 mixture of 2,4- and 2,6-isomers of tolylene diisocyanate, (c) 3.75 grams of water, (d) 0.8 gram of dibutyltin dilaurate, (e) 0.8 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and $R''$ represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.54
Tensile strength, lbs./in.$^2$ _____ 13.0.
Compression set, percent _____ 19.4.
Compression load, lbs./in.$^2$, 25%; 50% ___ 0.350; 0.471.

Example 29

A recipe was prepared comprising:

(a) 75 grams of polypropylene glycol having a molecular weight of 1900, a hydroxyl number of 58.5, a carboxyl number of 0.15 and containing 0.13 percent water and 75 grams of castor oil having a molecular weight of 830, a hydroxyl number of 161.5, a carboxyl number of 0.0, (b) 74.0 grams of an 80:20 mixture of 2,4- and 2,6-isomers of tolylene diisocyanate, (c) 3.75 grams of water, (d) 0.4 gram of dibutyltin dilaurate, (e) 0.5 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and $R''$ represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.51.
Tensile strength, lbs./in.$^2$ _____ 22.0.
Compression set, percent _____ 19.9.
Compression load, lbs./in.$^2$, 25%; 50% ___ 0.615; 0.827.

Example 30

A recipe was prepared comprising:

(a) 50 grams of polypropylene glycol having a molecular weight of 1900, a hydroxyl number of 58.5, a carboxyl number of 0.15 and containing 0.13 percent water; 50 grams of the triol adduct of propylene oxide started with glycerol having a molecular weight of 2300, a hydroxyl number of 72.0 and a carboxyl number of 0.18, and 50 grams of castor oil as characterized in Example 29, (b) 66.0 grams of an 80:20 mixture of 2,4- and 2,6-isomers of tolylene diisocyanate, (c) 3.75 grams of water, (d) 0.5 gram of dibutyltin dilaurate, (e) 0.5 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and $R''$ represents a butyl group).

The above-described mixture was thoroughly mixed and transferred to an open mold as soon as it started foaming. The foamed mixture cured in a matter of minutes and was characterized by the following physical properties:

Density, lbs./ft. _____ 2.72.
Tensile strength, lbs./in. _____ 17.0.
Compression set, percent _____ 8.3.
Compression load, lbs./in., 25%; 50% ____ 0.637; 0.860.

Example 31

A recipe was prepared comprising:

(a) 150 grams of a linear copolymer of ethylene oxide and propylene oxide containing 10 percent ethylene oxide and 90 percent propylene oxide started with ethylene glycol having a molecular weight of 1900, a hydroxyl number of 58.6, and a carboxyl number of 0.03 and 3.0 grams of 1,2,6-hexanetriol, (b) 60 grams of an 80:20 mixture of 2,4- and 2,6-isomers of tolylene diisocyanate, (c) 3.75 grams of water, (d) 0.8 gram of dibutyltin dilaurate, (e) 0.8 gram of a copolymer comprising the condensation product of a triethoxy end-blocked branched chain dimethylpolysiloxane having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and $R''$ represents a butyl group).

The above-described mixture was thoroughly mixed and transferred to an open mold as soon as it started foaming. The foamed mixture cured in a matter of minutes and was characterized by the following physical properties:

Density, lbs./ft.$^3$ _____ 2.32.
Tensile strength, lbs./in.$^2$ _____ 12.0.
Compression set, percent _____ 11.0.
Compression load, lbs./in.$^2$, 25%; 50% ___ 0.280; 0.363.

Example 32

A recipe was prepared comprising:

(a) 150 grams of a linear copolymer of ethylene oxide and propylene oxide containing 25 percent ethylene oxide and 75 percent propylene oxide started with ethylene glycol having a molecular weight of 1600, a hydroxyl number of 68.8 and a carboxyl number of 0.18 and 3.0 grams of 1,2,6-hexanetriol, (b) 63 grams of an 80:20 mixture of 2,4- and 2,6-isomers of tolylene diisocyanate, (c) 3.75 grams of water, (d) 0.8 gram of dibutyltin dilaurate, (e) 0.8 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).

The above-described mixture was thoroughly mixed and transferred to an open mold as soon as it started foaming. The foamed mixture cured in a matter of minutes and was characterized by the following physical properties:

| | |
|---|---|
| Density, lbs./ft. | 2.37. |
| Tensile strength, lbs./in. | 18.0. |
| Compression set, percent | 7.8. |
| Compression load, lbs./in. | 0.465; 0.608. |

Example 33

A recipe was prepared comprising:
  (a) 150 grams of polypropylene glycol having a molecular weight of 1900, a hydroxyl number of 58.5, a carboxyl number of 0.15 and containing 0.13 percent water and 3 grams of 1,2,6-hexanetriol,
  (b) 58 grams of an 80:20 mixture of 2,4- and 2,6-isomers of tolylene diisocyanate,
  (c) 3.75 grams of water,
  (d) 0.7 gram of dibutyltin dilaurate.
  (e) 0.7 gram of a copolymer comprising the condensation product of a triethoxy end-blocked branched chain dimethylpolysiloxane having one ethoxy group per terminal silicon atom having a molecular weight of 1524 and polyoxyethylene glycol having a molecular weight of 1500 (as represented by Formula II, supra, wherein $p$, $q$ and $r$ each have an average value of six (6), the $(C_nH_{2n}O)_z$ unit represents a polyoxyethylene block containing an average thirty-four (34) oxyethylene units and R″ represents a butyl group).
  (f) 0.1 gram of a dimethylpolysiloxane oil having a viscosity of 100 centistokes.

The above-described mixture was thoroughly mixed and transferred to an open mold as soon as it started foaming. The foamed mixture cured in a matter of minutes and was characterized by the following physical properties:

| | |
|---|---|
| Density, cu. ft. | 3.04 |
| Tensile strength, p.s.i | 22.0 |
| Compression at 25% p.s.i. | 0.573 |
| Compression at 50% p.s.i. | 0.764 |

Example 34

A recipe was prepared comprising:
  (a) 150 grams of polypropylene glycol having a molecular weight of 1844 and a hydroxyl number of 60.8 and 3 grams of trimethylol propane,
  (b) 60 grams of an 80:20 mixture of 2,4- and 2,6-isomers of tolylene diisocyanate,
  (c) 3.75 grams of water,
  (d) 0.8 gram of dibutyltin diacetate,
  (e) 0.4 gram of a copolymer of triethoxy end-blocked branched chain dimethylpolysiloxane having molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group), and 0.4 gram of a copolymer of triethoxy end-blocked branched chain dimethylpolysiloxane having a molecular weight of 858 and a butoxy end-blocked polyoxypropylene glycol having a molecular weight of about 800 (as represented by Formula II, supra, wherein $p$, $q$ and $r$ are three (3), the $(C_nH_{2n}O)_z$ unit represents a polyoxypropylene block containing from twelve (12) to thirteen (13) oxypropylene units and R″ represents a butyl group).

As soon as the mixture began to foam, it was transferred to an open mold and cured at 118° C. for 15 minutes. The resulting foam was then removable from the mold and characterized by the following physical properties:

| | |
|---|---|
| Density, lbs./ft.³ | 2.87 |
| Tensile strength, lbs./in.² | 16 |
| Compression load at 25% deflection, p.s.i. | .414 |
| Compression load at 50% deflection, p.s.i. | .573 |
| Compression set, percent | 13.7 |

Example 35

A recipe was prepared comprising:
  (a) 112.5 grams of polypropylene glycol having a molecular weight of 1928 and a hydroxyl number of 58.3 and 37.5 grams of a polyether prepared by the reaction of propylene oxide and 1,2,6-hexanetriol and having a hydroxyl number of 72 and a carboxyl number of 0.07,
  (b) 54.5 grams of an 80:20 mixture of 2,4- and 2,6-isomers of tolylene diisocyanate,
  (c) 3.75 grams of water,
  (d) 0.8 gram of dibutyltin dilaurate,
  (e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group).

As soon as the mixture began to foam, it was transferred to an open mold and after a period of 3 hours at 118° C., the resulting foam could be removed from the mold. The foam was characterized by the following physical properties:

| | |
|---|---|
| Density, lbs./ft.³ | 2.59 |
| Tensile strength, lbs./in.² | 18.0 |
| Compression load at 25% deflection, p.s.i. | 0.510 |
| Compression load at 50% deflection, p.s.i. | 0.653 |
| Compression set, percent | 10.9 |

Example 36

A recipe was prepared comprising:
  (a) 75 grams of polypropylene glycol having a molecular weight of 1928 and a hydroxyl number of 58.3 and 75 grams of a polyether prepared by the reaction of propylene oxide and triethanolamine and having a hydroxyl number of 60.9 and a basic carboxyl number,
  (b) 54.2 grams of an 80:20 mixture of 2,4- and 2,6-isomers of tolylene diisocyanate,
  (c) 3.75 grams of water,
  (d) 0.9 gram of dibutyltin dilaurate,
  (e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group).

As soon as the mixture began to foam, it was transferred to an open mold and after a period of 15 minutes at 118° C., the resulting foam could be removed from the mold. The foam was characterized by the following physical properties:

| | |
|---|---|
| Density, lbs./ft.³ | 2.57 |
| Tensile strength, lbs./in.² | 16 |
| Compression load at 25% deflection, p.s.i. | 0.446 |
| Compression load at 50% deflection, p.s.i. | 0.574 |
| Compression set, percent | 11.5 |

Example 37

A recipe was prepared comprising:
  (a) 100 grams of polypropylene glycol having a molecular weight of 1928 and a hydroxyl number of 58.3 and 50 grams of a polyether made by the reaction of propylene oxide and 1,2,6-hexanetriol and having a hydroxyl number of 74.5, (b) 55 grams of an 80:20 mixture of 2,4- and 2,6-isomers of tolylene diisocyanate, (c) 3.75 grams of water, (d) 0.9 gram of dibutyltin dilaurate, (e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group).

As soon as the mixture began to foam, it was transferred to an open mold and after a period of 15 minutes at 118° C., the resulting foam could be removed from the mold. The foam was characterized by the following physical properties:

| | |
|---|---|
| Density, lbs./ft.³ | 2.65 |
| Tensile strength, lbs./in.² | 19 |
| Compression load at 25% deflection, p.s.i. | 0.573 |
| Compression load at 50% deflection, p.s.i. | 0.765 |
| Compression set, percent | 13.4 |

*Example 38*

A recipe was prepared comprising:

(a) The above-described recipe was added to 150 grams of a polyether prepared by the reaction of propylene oxide and glycerol and having a hydroxyl number of 54.2 and a carboxyl number of 0.09, (b) 54 grams of an 80:20 mixture of 2,4- and 2,6-isomers of tolylene diisocyanate, (c) 3.75 grams of water, (d) 0.9 gram of dibutyltin dilaurate, (e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group).

The mixture was stirred and transferred to an open mold as soon as it started to foam. The resulting foam was characterized by the following physical properties:

| | |
|---|---|
| Density, lbs./ft.³ | 2.92 |
| Tensile strength, lbs./in.² | 22.4 |
| Compression load at 25% deflection, p.s.i. | 0.796 |
| Compression load at 50% deflection, p.s.i. | 1.05 |
| Compression set, percent | 5.6 |

*Example 39*

A recipe was prepared comprising:

(a) 75 grams of polypropylene glycol having a molecular weight of 2120, a hydroxyl number of 52.49 and a carboxyl number of 0.04 and 75 grams of a polyether prepared by the reaction of propylene oxide and glycerol and having a hydroxyl number of 54.2 and a carboxyl number of 0.09, (b) 54 grams of an 80:20 mixture of 2,4- and 2,6-isomers of tolylene diisocyanate, (c) 3.75 grams of water, (d) 0.9 gram of dibutyltin dilaurate, (e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group).

As soon as the mixture began to foam, it was transferred to an open mold and after a period of 15 minutes at 130° C., the resulting foam could be removed from the mold. The foam was characterized by the following physical properties:

| | |
|---|---|
| Density, lbs./ft.³ | 2.79 |
| Tensile strength, lbs./in.² | 24.7 |
| Compression load at 25% deflection, p.s.i. | 0.669 |
| Compression load at 50% deflection, p.s.i. | 0.892 |
| Compression set, percent | 6.7 |

*Example 40*

A recipe was prepared comprising:

(a) 136.4 grams of polypropylene glycol having a molecular weight of 1844 and a hydroxyl number of 60.8; 13.6 grams of a polyether made by the reaction of propylene oxide and 1,2,6-hexanetriol and having a hydroxyl number of 231.5 and a carboxyl number of 0.03, (b) 57.5 grams of an 80:20 mixture of 2,4- and 2,6-isomers of tolylene diisocyanate, (c) 3.75 grams of water, (d) 0.7 gram of dibutyltin dilaurate, (e) 0.7 gram of a copolymer triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group).

As soon as the mixture began to foam, it was transferred to an open mold and after a period of 8 hours, the resulting foam could be removed from the mold. This foam was characterized by the following physical properties:

| | |
|---|---|
| Density, lbs./ft.³ | 2.76 |
| Tensile strength, lbs./in.² | 18 |
| Compression load at 25% deflection, p.s.i. | 0.542 |
| Compression load at 50% deflection, p.s.i. | 0.733 |
| Compression set, percent | 16.3 |

*Example 41*

A recipe was prepared comprising:

(a) 30 grams of polypropylene glycol having a molecular weight of 1928 and a hydroxyl number of 58.3 and 120 grams of castor oil having a hydroxyl number of 181.0, (b) 72.6 grams of an 80:20 mixture of 2,4- and 2,6-isomers of tolylene diisocyanate, (c) 3.75 grams of water, (d) 0.5 gram of dibutyltin dilaurate, (e) 0.5 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group).

As soon as the mixture began to foam, it was transferred to an open mold and after a period of 2 hours at 110° C., the resulting foam could be removed from the mold. The foam was characterized by the following physical property:

| | |
|---|---|
| Density, lbs./ft.³ | 2.79 |

*Example 42*

A recipe was prepared comprising:

(a) 150 grams of polypropylene glycol having a molecular weight of 1980, a hydroxyl number of 56.7 and a carboxyl number of 0.007 and 1.5 grams of urea, (b) 58 grams of an 80:20 mixture of 2,4- and 2,6-isomers of tolylene diisocyanate,
(c) 3.75 grams of water,
(d) 0.9 gram of dibutyltin dilaurate,
(e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R'' represents a butyl group).

As soon as the mixture began to foam, it was transfered to an open mold. The resulting foam was removable after a 15 minute cure at 130° C., indicating a highly efficient curing reaction. It was characterized by the following physical properties:

| | |
|---|---|
| Density, lbs./ft.³ | 2.16 |
| Tensile strength, lbs./in.² | 16 |
| Compression load at 25% deflection, p.s.i. | 0.334 |
| Compression load at 50% deflection, p.s.i. | 0.446 |
| Compression set, percent | 14.5 |

*Example 43*

A recipe was prepared comprising:
(a) 150 grams of propylene glycol having a molecular weight of 2100, a hydroxyl number of 53.5 and a carboxyl number of 0.11 and 0.53 gram of a urea-formaldehyde resin prepared by reacting 0.47 mol of formaldehyde with 0.20 mol of urea.
(b) 58 grams of an 80:20 mixture of 2,4- and 2,6-isomers of tolylene diisocyanate,
(c) 3.75 grams of water,
(d) 0.9 gram of dibutyltin dilaurate,
(e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R'' represents a butyl group).

As soon as the mixture began to foam, it was transferred to an open mold. This resulting foam could be removed from the mold after a 15 minute cure at 130° C. The foam was characterized by the following physical properties:

| | |
|---|---|
| Density, lbs./ft.³ | 2.73 |
| Tensile strength, lbs./in.² | 12.4 |
| Compression load at 25% deflection, p.s.i. | 0.478 |
| Compression load at 50% deflection, p.s.i. | 0.637 |
| Compression set, percent | 9.4 |

*Example 44*

A recipe was prepared comprising:
(a) 150 grams of polypropylene glycol having a molecular weight of 1840, a hydroxyl number of 61.02 and a carboxyl number of 0.026 and 0.75 gram of diethanolamine,
(b) 55.5 grams of an 80:20 mixture of 2,4- and 2,6-isomers of tolylene diisocyanate,
(c) 3.75 grams of water,
(d) 0.9 gram of dibutyltin dilaurate,
(e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R'' represents a butyl group).

As soon as the mixture began to foam, it was transferred to an open mold. The resulting foam was removed from the mold after it had been cured for 45 minutes at 130° C., indicating a highly efficient curing reaction. The foam was characterized by the following physical properties:

| | |
|---|---|
| Density, lbs./ft.³ | 2.34 |
| Tensile strength, lbs./in.² | 10.2 |
| Compression load at 25% deflection, p.s.i. | 0.309 |
| Compression load at 50% deflection, p.s.i. | 0.414 |
| Compression set, percent | 10.3 |

*Example 45*

A recipe was prepared comprising:
(a) 150 grams of polypropylene glycol having a molecular weight of 2100, a hydroxyl number of 53.5 and a carboxyl number of 0.11 and 3 grams of triisopropanolamine,
(b) 55 grams of an 80:20 mixture of 2,4- and 2,6-isomers of tolylene diisocyanate,
(c) 3.75 grams of water,
(d) 0.9 gram of dibutyltin dilaurate,
(e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R'' represents a butyl group).

As soon as the mixture began to foam, it was transferred to an open mold. The resulting foam could be removed from the mold after a 30 minute cure at 130° C., indicating a highly efficient curing reaction. The foam was characterized by the following physical properties:

| | |
|---|---|
| Density, lbs./ft.³ | 2.47 |
| Tensile strength, lbs./in.² | 14.3 |
| Compression load at 25% deflection, p.s.i. | 0.328 |
| Compression load at 50% deflection, p.s.i. | 0.446 |
| Compression set, percent | 17.0 |

*Example 46*

A recipe was prepared comprising:
(a) 150 grams of polypropylene glycol having a molecular weight of 2100, a hydroxyl number of 53.5 and a carboxyl number of 0.11 and 1 gram of diisopropanolamine,
(b) 52.6 grams of an 80:20 mixture of 2,4- and 2,6-isomers of tolylene diisocyanate,
(c) 3.75 grams of water,
(d) 0.9 gram of dibutyltin dilaurate,
(e) 0.9 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R'' represents a butyl group).

As soon as the mixture began to foam, it was transferred to an open mold and cured at 130° C. for 30 minutes. The resulting foam was then removable from the mold, indicating a highly efficient curing reaction. The foam was characterized by the following physical properties:

| | |
|---|---|
| Density, lbs./ft.³ | 2.76 |
| Tensile strength, lbs./in.² | 11.0 |
| Compression load at 25% deflection, p.s.i. | 0.389 |
| Compression load at 50% deflection, p.s.i. | 0.542 |
| Compression set, percent | 11.7 |

Example 47

A recipe was prepared comprising:

(a) 50 grams of a polyether prepared by the reaction of propylene oxide and pentaerythritol and having a hydroxyl number of 419.5 and a negative carboxyl number, (b) 45.6 grams of an 80:20 mixture of 2,4- and 2,6-isomers of tolylene diisocyanate containing 0.1 percent of dissolved ethyl cellulose, (c) 1.3 grams of water, (d) 0.34 gram of dibutyltin dilaurate, (e) 0.65 gram of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ are six (6), the $(C_nH_{2n}O)_z$ unit represents a mixed polyoxyethyleneoxypropylene block containing seventeen (17) oxyethylene units and thirteen (13) oxypropylene units and R″ represents a butyl group).

The mixture was stirred and transferred to an open mold as soon as it started to get warm. The resulting foam was characterized by the following physical properties:

Density, lbs./ft.³ _____ 2.3
70% strength retention temp., °C. _____ 81
10% compression load, p.s.i. _____ 27

Example 48

A recipe was prepared comprising:

(a) a mixture of (1) 60 grams of a polyether prepared by the reaction of propylene oxide with a two-step phenolformaldehyde resin containing 2,2′ linkage and an average of 4 to 5 phenolic rings per molecule (prepared from 100 parts by weight of phenol and 56.5 parts by weight of formaldehyde in accordance with the procedure set forth in Example 1 of U.S. 2,475,587 and having a viscosity of 14 centistokes as a 35.0 weight percent in ethanol) until a hydroxyl number of 220.2 and (2) 40 grams of a polyether prepared by the reaction of propylene oxide with glycerol until a hydroxyl number of 650.5 was obtained, said mixture having a hydroxyl number of 392.3, (b) 74.0 grams of an 80:20 mixture of 2,4- and 2,6-isomers of tolylene diisocyanate containing 0.1 percent of dissolved ethyl cellulose, (c) 1.3 grams of water, (d) 0.67 gram of dibutyltin dilaurate, (e) 1.3 grams of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II, supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The mixture was stirred and transferred to an open mold as soon as it started to get warm. The foam was removable from the mold in 3 minutes, indicating a highly efficient curing reaction. The foam was characterized by the following physical properties:

Density, lbs./ft.³ _____ 3.4
70% strength retention temp., °C. _____ 89
10% compression load, p.s.i. _____ 53

Example 49

A recipe was prepared comprising:

(a) a mixture of (1) 70 grams of a polyether prepared by the reaction of propylene oxide with a two-step phenol-formaldehyde resin containing an average of 6 phenolic rings per molecule prepared from 100 parts by weight of phenol and 72 parts by weight of formaldehyde in the presence of 0.56 part by weight of oxalic acid as a catalyst in accordance with the procedure set forth in Example 2 of U.S. 2,475,587 and having a plate flow of 30 mm. at 125° C.) until a hydroxyl number of 265.7 was obtained an (2) 30 grams of a polyether prepared by the reaction of propylene oxide with glycerol until a hydroxyl number of 650.5 was obtained, said mixture having a hydroxyl number of 381.1 and a negative carboxyl number, (b) 67.3 grams of an 80:20 mixture of 2,4- and 2,6-isomers of tolylene diisocyanate containing 0.1 percent of dissolved ethyl cellulose, (c) 1.3 grams of water, (d) 0.67 gram of dibutyltin dilaurate (e) 1.3 grams of a copolymer of triethoxy end-blocked branched chain dimethylpolysiloxane having a molecular weight of 1524 and butoxy end-blocked polyoxyethyleneoxypropylene glycol having a molecular weight of 1500 (as represented by Formula II supra, wherein $p$, $q$ and $r$ have an average value of six (6), the $(C_nH_{2n}O)_z$ unit represents a mixed polyoxyethyleneoxypropylene block containing an average of seventeen (17) oxyethylene units and an average of thirteen (13) oxypropylene units and R″ represents a butyl group).

The mixture was stirred and transferred to an open mold as soon as it started to get warm. The foam was removable from the mold in 3 minutes, indicating a highly efficient curing reaction. The foam was characterized by the following physical properties:

Density, lbs./ft.³ _____ 3.4
70% strength retention temp., °C. _____ 86
10% compression load, p.s.i. _____ 58

90 grams of a propylene oxide addition product of sorbitol [1] (Hydroxyl No. 367.5) were mixed with 86.2 grams of a semiprepolymer prepared therefrom (29.9% total free NCO), 0.65 gram dibutyltin dilaurate, 0.45 gram of a silicone oil surfactant (siloxane-oxyalkylene copolymer) and 37 grams of trichloromonofluoromethane. The foamed product, after curing for 10 minutes at 70° C., had a density of 1.8 lbs./cu.ft. and a compressive strength of 11 p.s.i. at 85° C. parallel to the foam rise and 6 p.s.i. perpendicular to the foam rise.

In the preceding examples, the density was determined by weighing a cylindrical sample two inches in diameter and one inch thick and thereupon calculating the density in pounds per cubic foot. To evaluate compression, a cylindrical sample two inches in diameter and one inch thick was placed on the anvil (six inch diameter) of an Instron equipped for compression tests, the cross head moved a plate of three inches in diameter toward the anvil at a rate of two inches per minute, and the stress load on the anvil was plotted against the deflection of the sample. The stress load is given in p.s.i. for 10%, 25% and 50% deflections. The compression set is measured in accordance with the procedure outline is ASTM D395–53T, Method B. Plate flow is determined by taking two grams of resin and forming a pellet 6 mm. thick and 12 mm. in diameter. This placed on a 6″ x 6″ glass plate and placed in an oven at 125° C. After 3 minutes, the plate is tilted at an angle of 65° from the horizontal and after 20 minutes more is removed from the oven and the length of the flow path is measured.

Tensile strength and elongation were determined in accordance with the procedure set forth in Rubber Age, volume 79, Number 5, pages 803–810 (1956). Percentage closed cells or closed cell content was determined by the method of W. J. Remington and R. Pariser presented before the Division of Rubber Chemistry, ACS, in New York, September 12, 1957, and published in Rubber World, volume 138, Number 2, pages 261–264 (1958).

---

[1] A charge of 4360 grams of 70% by weight aqueous sorbitol and 127 grams of 40% by weight aqueous potassium hydroxide was initially vacuum stripped at 120° C. The stripped material was then reacted with 13,300 grams of propylene oxide at an average temperature of 115° C. at 40 p.s.i.g. over a 10 hour period.

Strength retention in °C at 70% was determined by placing specimens of foams ⅛" x ½" x 3" in the jaws of an Instron machine which extend into a temperature cabinet. After the specimen is mounted in the jaws the cabinet is sealed and a constant temperature is maintained therein for three minutes prior to application of load. Load is applied in tension and the specimen is extended by an amount equivalent to one percent of the original jaw separation. The load is immediately relaxed and, since the limit of elasticity has not been exceeded, the specimen returns essentially to its original length. The rate of head movement is 0.2 in./min. Load and head movement are recorded automatically on a continuous strip chart. This procedure is followed at various temperature increments, starting at about room temperature and continuing up until the load necessary to extend the specimen one percent has fallen below 70% of that required at about room temperature. The loads at one percent extension are then plotted against the temperatures and connected by a curve. The temperature at which the load is 70% of the load at about room temperature is then recorded as the strength retention temperature in °C. (70%).

What is claimed is:

1. A process for preparing stable, cured, foamed polyurethane resins without the application of external heat which comprises reacting together a polyether polyol, an organic polyisocyanate, water and a surfactant comprising a polysiloxane-oxylalkylene copolymer in the presence of an organo-tin catalyst containing a direct carbon to tin valence bond and at least one bond from said tin to a member of the group consisting of halogen, oxygen, nitrogen, sulfur and phosphorus.

2. The process of claim 1 wherein the polyether polyol is polypropylene glycol.

3. The process of claim 1 wherein the polyether polyol is a propylene oxide adduct of a trihydroxyalkane.

4. The process of claim 1 wherein the polyether polyol is a propylene oxide adduct of glycerol.

5. The process of claim 1 wherein the organic polyisocyanate is tolylene diisocyanate.

6. A process for preparing a simultaneously foamed and cured polyether-polyurethane foamed resin which comprises reacting a polyether containing at least one ether oxygen atom and at least two hydroxyl radicals, said radicals being selected from the group consisting of alcoholic and phenolic hydroxyl radicals, a molar excess of an organic polyisocyanate and a foaming agent in the presence of an organo-tin catalyst having a direct carbon to tin valence bond, the tin atom also being connected to a member selected from the group consisting of halogen, oxygen, sulfur, nitrogen and phosphorus, said catalyst being employed in an amount sufficient to cause reaction and a surfactant comprising a polysiloxane-oxyalkylene copolymer.

7. A process for preparing a foamed resin which comprises reacting a polyether containing at least one ether oxygen atom and at least two hydroxyl radicals, said radicals being selected from the group consisting of alcoholic and phenolic hydroxyl radicals, a molar excess of an organic polyisocyanate and a foaming agent in the presence of an organo-tin catalyst having a direct carbon to tin valence bond and at least one other bond from said tin to a member of the group consisting of halogen, oxygen, sulfur, nitrogen and phosphorus, said catalyst being employed in an amount sufficient to cause reaction and a surfactant comprising a polysiloxane-oxyalkylene copolymer.

8. The process of claim 7 wherein the polyether is a mixed ethylene oxide-propylene oxide adduct of ethylenediamine.

9. The process of claim 7 wherein the organotin catalyst is dibutyltin dilaurate.

10. The process of claim 7 wherein the organotin catalyst is dibutyltin diacetate.

11. The process of claim 7 wherein the polysiloxane-oxyalkylene copolymer surfactant is a composition of the formula

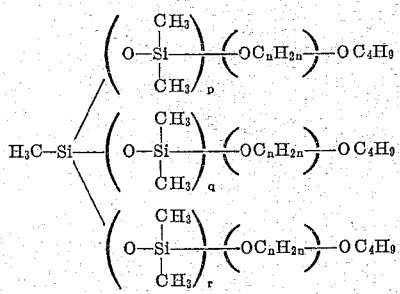

wherein $p$, $q$ and $r$ individually represent numbers that have average values of about 6 and wherein the $\text{-(OC}_n\text{H}_{2n}\text{)-}$ moiety represents a mixed polyoxyethylene-oxypropylene block containing an average of about seventeen oxyethylene units and about thirteen oxypropylene units.

12. A process for preparing a foamed resin which comprises reacting a polyether containing at least one ether oxygen atom and at least two hydroxyl radicals, said radicals being selected from the group consisting of alcoholic and phenolic hydroxyl radicals, a molar excess of an organic polyisocyanate and a foaming agent in the presence of an organo-tin catalyst having the formula:

wherein the R's represent hydrocarbon radicals and the X's represent acyl radicals, said catalyst being employed in an amount sufficient to cause reaction and a surfactant comprising a siloxane-oxyalkylene copolymer having the formula:

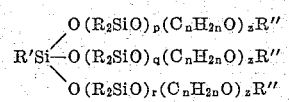

wherein R', R and R'' are monovalent hydrocarbon radicals, $p$, $q$ and $r$ are integers each having a value of at least one, $n$ is an integer having a value of 2 to 4, and $z$ is an integer having a value of at least 5.

13. A process for preparing a foamed resin which comprises reacting a polyether containing at least one ether oxygen atom and at least two hydroxyl radicals, said hydroxyl radicals being selected from the group consisting of alcoholic and phenolic hydroxyl radicals and having a molecular weight of about 200–10,000, a molar excess of an organic polyisocyanate and a foaming agent in the presence of an organo-tin catalyst having a direct carbon to tin valence bond and at least one other bond from said tin atom to a member selected from the group consisting of halogen, oxygen, sulfur, nitrogen and phosphorus, said catalyst being present in an amount sufficient to cause reaction and a surfactant comprising a polysiloxane-oxyalkylene copolymer.

14. A process for producing a foamed resin which comprises reacting a mixture comprising a polyether polyol having at least one ether oxygen and at least two hydroxyl groups and a molar excess of an organic polyisocyanate, in the presence of a foaming agent; an organotin catalyst having a direct carbon to tin valence bond and at least one other bond from tin to a member of the group consisting of halogen, oxygen, sulfur, nitrogen, and phosphorus, said catalyst being present in an amount sufficient to cause reaction; and a surfactant comprising a polysiloxane-oxyalkylene copolymer and a small amount of a dimethylpolysiloxane oil.

15. In a process for the production of a polyurethane foamed resin comprising reacting (a) a polyether having at least one ether oxygen and at least two hydroxyl radicals, said radicals being selected from the group consisting of alcoholic and phenolic hydroxyl, with (b) an organic polyisocyanate, in the presence of (c) a foaming agent and (d) an organotin catalyst, the improvement is said process which comprises carrying out said process in the presence of a polysiloxane-polyoxyalkylene block copolymer surfactant.

References Cited by the Examiner

UNITED STATES PATENTS

| | | | |
|---|---|---|---|
| 2,374,136 | 4/45 | Rockrock | 260—77.5 |
| 2,720,507 | 10/55 | Caldwell | 260—75 |
| 2,726,219 | 12/55 | Hill | 260—2.5 |
| 2,764,565 | 9/56 | Hoppe et al. | 260—2.5 |
| 2,834,748 | 5/58 | Bailey et al. | 260—42 |
| 2,866,774 | 12/58 | Price | 260—2.5 |
| 2,893,898 | 7/59 | Evans et al. | 260—77.5 |
| 2,895,603 | 7/59 | Freeman | 260—2.5 |
| 2,929,800 | 3/60 | Hill | 260—2.5 |
| 2,948,691 | 8/60 | Windemuth et al. | 260—2.5 |
| 2,993,813 | 7/61 | Tischbein | 260—2.5 |
| 3,075,927 | 1/63 | Lanham | 260—2.5 |
| 3,075,928 | 1/63 | Lanham | 260—2.5 |

FOREIGN PATENTS 860,109  12/52  Germany.

LEON J. BERCOVITZ, *Primary Examiner*.